April 13, 1948.    H. R. SCHUTZ    2,439,754
BURN-OFF METHODS
Filed May 1, 1943
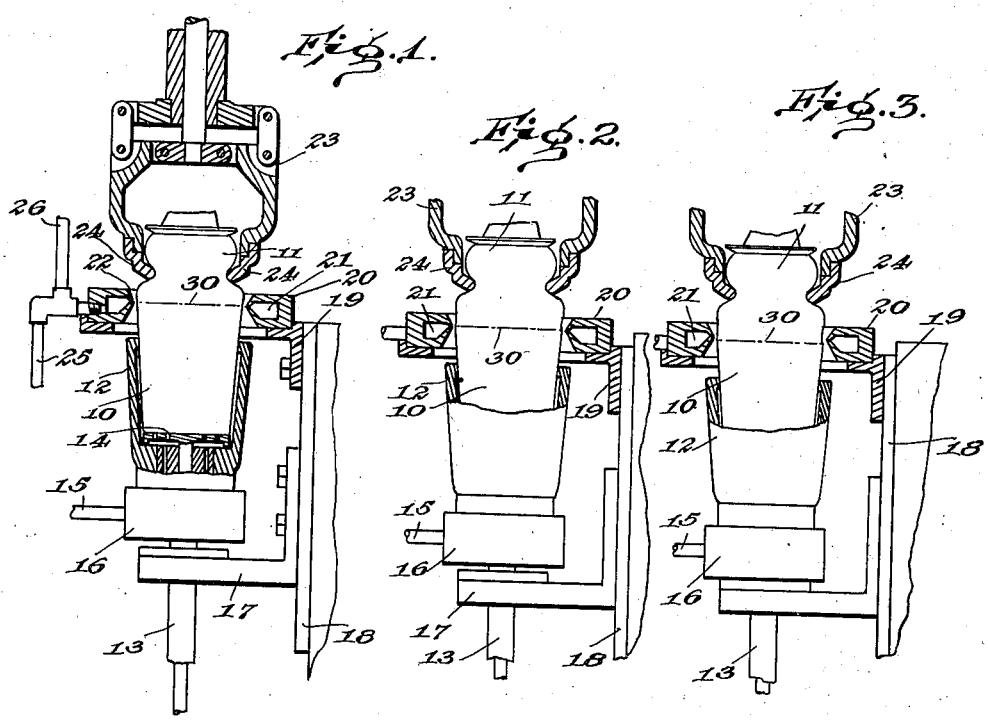
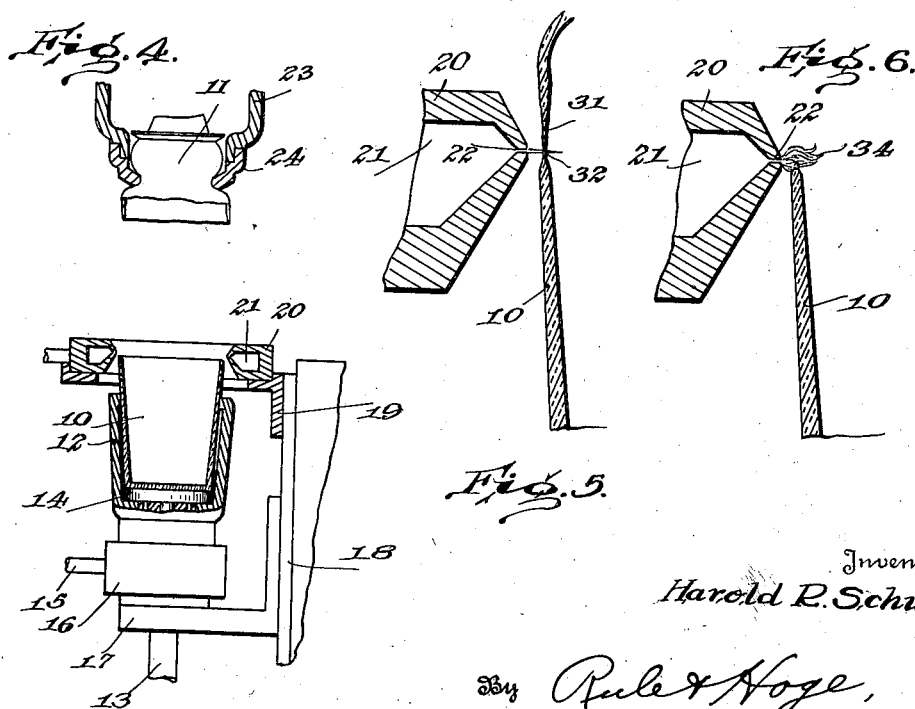
Inventor
Harold R. Schutz
By Rule & Hoge,
Attorneys Patented Apr. 13, 1948

2,439,754

UNITED STATES PATENT OFFICE 2,439,754

BURN-OFF METHOD

Harold R. Schutz, Toledo, Ohio, assignor, by mesne assignments, to Owens-Illinois Glass Company, Toledo, Ohio, a corporation of Ohio Application May 1, 1943, Serial No. 485,331

6 Claims. (Cl. 49—77)

My invention relates to a method of severing the moil or waste material from glass tumblers or other hollow glassware by a burn-off operation, finishing and shaping the rim from which the moil has been separated, and controlling the formation and size of the annular bead which forms along said rim. In the manufacture of blown hollow glassware such as tumblers and the like, it is customary to blow a charge or gob of glass and mold it to hollow form while leaving a moil of waste material attached to the blown ware. The moil is thereafter severed from the blown article by a burn-off operation. In this operation an annular burner supplies a ring of flame directly against the article at the line of severance. The intense heat of this localized flame quickly severs the tumbler or blown article from the moil. Immediately following this severance, the molten glass at the line of severance forms a bead which extends along and forms the finished edge of the tumbler.

An object of the present invention is to provide a novel method of shaping the rim of the blown article, regulating and controlling the wall thickness at and adjacent to the rim, and controlling and reducing the size of the bead formed by the burn-off operation.

Other objects of the invention will appear hereinafter.

Referring to the accompanying drawings:

Fig. 1 is a part-sectional elevation of an apparatus adapted for use in practicing my invention and shows the relation of parts at the commencement of the burn-off operation.

Fig. 2 is a similar view showing the relation of parts after the article has been heated and stretched at the zone of severance.

Fig. 3 shows the next step in the operation in which the article has been lowered relative to the burner for the final severing operation.

Fig. 4 is a view showing the parts after the moil has been severed.

Fig. 5 is a fragmentary sectional view showing the application of the severing flame after the glass has been softened and stretched.

Fig. 6 is a similar view showing the application of a gas flame to the rim of the tumbler and the small bead which has formed thereon after the severance.

Referring to the accompanying drawings:

The work-piece as shown, is a glass tumbler 10 with an integral moil 11 or waste piece of glass which is to be removed by the burn-off operation. The work-piece is placed in a rotary centering chuck 12 on a vertical shaft 13. The work-piece is firmly held in the chuck by means of suction applied through a perforated bottom plate 14 in a suction line including a suction pipe 15 and a vacuum head or chamber 16. The shaft 13 is journalled for rotation in a bracket 17 attached to a support 18 which may be mounted for up and down movement. A bracket 19 attached to the support 18 has mounted thereon a ring burner 20. The burner is formed with an annular chamber 21 provided with jet openings 22 (Figs. 5 and 6) spaced at short intervals throughout the periphery of the burner for supplying a ring of flame which is directed against the work-piece.

During the burn-off operation, the moil is held by a gripping device 23, comprising gripping jaws 24 which grasp the neck of the moil. The gripping device and the chuck 12 are rotated at the same speed. Oxygen may be supplied to the burners through a pipe 25, and fuel gas through a pipe 26.

In operation, the work-piece is held in the chuck in the position indicated in Fig. 1, while the moil is held by the gripping jaws. A burn-off flame is applied by the burner at the horizontal plane of the line 30. This may be an intensely hot flame supplied by the mixture of fuel gas and oxygen, and is concentrated in a narrow zone or line surrounding the work-piece. While this flame is applied and as the glass softens, the work-piece is stretched by a relative movement of the gripping device and the holding chuck, in a direction lengthwise of the work-piece. This movement may be either an upward movement of the gripping device 23 or a downward movement of the centering chuck 12, its support and the burner 20. During such movement, the glass, as it is softened by the burner flame, is stretched out so that the walls of the work-piece are thinned, thus forming a narrow zone 31 (Fig. 5) of plastic glass extending upwardly from the line 32 at which the flame is applied. There is thus formed a band or ring of comparatively thin soft glass uniting the tumbler and the moil.

After this softening and stretching of the glass, the holding chuck 12 is suddenly dropped a short distance, carrying the work-piece with it. During this drop of the work-piece, the moil is held against downward movement by the gripping device 23 so that the weight of the chuck and work-piece is transferred to the band of softened glass, thereby suddenly increasing the stretching force. The burner is also held stationary so that the work-piece and burner are relatively positioned as shown in Fig. 3, with the jet openings or flame line a short distance above the line 30. In this manner the burner is positioned to direct a ring of flame against the band 31 of softened glass at a plane intermediate the upper and lower margins thereof. However, the sudden stretching of the glass by said dropping of the work-piece while the burner flame is directed against the thin softened walls, results in separating or severing the moil immediately when said stretching takes place. The severance of the moil from the tumbler is caused by the stretching of the glass, but under the control of the burner and dependent on the application of the intense localized heat of the flame at the line of severance, which results in softening the glass to a degree necessary to permit such severance.

The separation of the moil from the burner leaves the rim of the tumbler or work-piece just below the burner flame. This thinned edge being in a molten or fluid condition, instantly forms a small annular bead extending along said rim and forming the upper surface thereof. When the moil is thus severed, the oxygen is immediately cut off from the burner, leaving a lazy flame 34 (Fig. 6) playing on the beaded rim of the tumbler, which serves to smooth and level or finish off the rim surface while reducing or preventing enlargement of said bead. The immediate cutting off of the oxygen following the severence of the moil prevents enlargement of the bead which would otherwise occur under the influence of the oxygen-fed flame.

Modifications may be resorted to within the spirit and scope of my invention.

I claim:

1. The method of severing the moil from a blown glass article which comprises surrounding the article with a ring of flame applied to the surface of the article adjacent the plane of severance, thereby heating and softening the glass at said plane, applying stretching force to the said article and moil at opposite sides of said plane as the glass softens, thereby thinning and stretching the walls of the article to form a band of softened glass uniting the moil and article with the ring of flame at one edge of said band, and suddenly increasing the stretching force while the said band of glass remains softened and simultaneously shifting the application of the ring flame to a severing line intermediate the edges of said band, and severing the moil from the article at said severing line.

2. In the method of burning off glassware wherein a moil and tumbler, while still united, are supported in superposed relationship and an oxygen-gas flame is applied to the glass at the juncture of the moil and tumbler, the steps consisting of slowly stretching the glass as it softens under influence of the flame, suddenly applying an increased stretching force and accelerating the speed of stretching the glass and thereby severing the moil and tumbler, and shaping the severed edge of the tumbler with a gas flame only.

3. In the method of burning off glassware wherein a moil and tumbler, while still united, are supported in superposed relationship and an oxygen-gas flame is applied to the glass at the juncture of the moil and tumbler, the steps consisting of slowly stretching the glass as it softens under influence of the flame, suddenly applying an increased stretching force and accelerating the speed of stretching the glass and thereby severing the moil and tumbler, shutting off the oxygen immediately after the severing step and continuing the application of gas to the severed edge of the tumbler to form a small dimension bead.

4. The method of severing a moil from a blown glass article which comprises applying a ring of flame to the exterior surface of the article adjacent to the plane of severance, gripping the moil and stretching the glass as it softens by pulling the article and moil in opposite directions and thereby forming a band of comparatively thin soft glass uniting the moil and the article, holding the ring of flame in a fixed position relative to the said article during said stretching whereby the ring of flame is held at one edge of said band, and suddenly, after said stretching, pulling the article in a direction away from the moil and thereby moving it relatively to the moil through a predetermined short distance, holding the ring of flame stationary relative to the moil during said movement of the article so that the latter is positioned at a plane of severance intermediate the ends of said band of softened glass, and by said sudden pulling of the article applying a stretching force by which the moil is severed while under the influence of the ring of flame and with said severance dependent on the application of intense localized heat of the flame at the line of severance.

5. The method of severing a moil from a blown glass article which comprises supporting the article and moil in superposed relationship before the severance, applying a ring of flame to the exterior surface of the article at the juncture of the moil and said article and with the flame confined to a narrow zone and thereby softening the glass by the heat of the flame, slowly stretching the glass as it softens and thereby forming a band of softened glass uniting the article and moil, and then suddenly applying an increased stretching force and thereby further stretching the glass at an accelerated speed and severing the moil from the article.

6. The method of severing a moil from a blown glass article which comprises supporting the article and moil in superposed relationship before the severance, applying a ring of flame to the exterior surface of the article at the juncture of the moil and said article and with the flame confined to a narrow zone and thereby softening the glass by the heat of the flame, slowly stretching the glass as it softens and thereby forming a band of softened glass uniting the article and moil, and then suddenly applying an increased stretching force and thereby further stretching the glass at an accelerated speed and severing the moil from the article and during said further stretching, shifting the position of the ring of flame relative to the article through a predetermined distance to a plane intermediate to the ends of said softened band of glass and thereby determining the plane of severance.

HAROLD R. SCHUTZ.

REFERENCES CITED

The following references are of record in the file of this patent:

UNITED STATES PATENTS

| Number | Name | Date |
| --- | --- | --- |
| 1,577,538 | Parker | Mar. 23, 1926 |
| 1,577,654 | Parker | Mar. 23, 1926 |
| 1,578,098 | Schrader | Mar. 23, 1926 |
| 1,645,991 | Higgins | Oct. 18, 1927 |
| 1,674,366 | Kadow et al. | June 19, 1928 |
| 1,920,528 | Butler et al. | Aug. 1, 1933 |
| 2,215,980 | Schreiber | Sept. 24, 1940 |
| 2,239,627 | Schutz | Apr. 22, 1941 |
| 2,270,152 | Themak | Jan. 13, 1942 |
| 2,334,001 | Hapgood | Nov. 9, 1943 |
| 2,334,111 | McNamaran et al. | Nov. 9, 1943 |

FOREIGN PATENTS

| Number | Country | Date |
| --- | --- | --- |
| 541,755 | Great Britain | Dec. 10, 1941 |
| 735,412 | France | Aug. 30, 1932 |